United States Patent
Yamamoto et al.

(10) Patent No.: US 10,375,376 B2
(45) Date of Patent: Aug. 6, 2019

(54) POSE ESTIMATION APPARATUS AND VACUUM CLEANER SYSTEM

(71) Applicants: KABUSHIKI KAISHA TOSHIBA, Tokyo (JP); TOSHIBA LIFESTYLE PRODUCTS & SERVICES CORPORATION, Kanagawa (JP)

(72) Inventors: Takuma Yamamoto, Kanagawa (JP); Nao Mishima, Tokyo (JP)

(73) Assignees: Kabushiki Kaisha Toshiba, Tokyo (JP); Toshiba Lifestyle Products & Services Corporation, Kanagawa (JP)

( * ) Notice: Subject to any disclaimer, the term of this patent is extended or adjusted under 35 U.S.C. 154(b) by 343 days.

(21) Appl. No.: 15/354,378

(22) Filed: Nov. 17, 2016

(65) Prior Publication Data
US 2017/0140540 A1    May 18, 2017

(30) Foreign Application Priority Data
Nov. 17, 2015 (JP) .................. 2015-225013

(51) Int. Cl.
*G05D 1/02* (2006.01)
*G06T 7/73* (2017.01)
(Continued)

(52) U.S. Cl.
CPC ......... *H04N 13/211* (2018.05); *G05D 1/0251* (2013.01); *G06T 7/593* (2017.01);
(Continued)

(58) Field of Classification Search
CPC ......... H04N 13/211; G06T 7/593; G06T 7/74; G06T 7/85; G06T 2207/30244;
(Continued)

(56) References Cited

U.S. PATENT DOCUMENTS

| 7,925,049 B2 * | 4/2011 | Zhu .................. G06K 9/32 |
| | | 382/103 |
| 2004/0167670 A1 * | 8/2004 | Goncalves ......... G01C 21/12 |
| | | 700/259 |

(Continued)

FOREIGN PATENT DOCUMENTS

| CN | 104414590 A | 3/2015 |
| CN | 102012706 B | 6/2015 |

(Continued)

OTHER PUBLICATIONS

Extended European Search Report issued by the European Patent Office dated Apr. 20, 2017, for Application No. EP 16198145.1.

(Continued)

*Primary Examiner* — Wesley J Tucker
(74) *Attorney, Agent, or Firm* — Finnegan, Henderson, Farabow, Garrett & Dunner, L.L.P.

(57) ABSTRACT

According to an embodiment, a pose estimation apparatus includes first and second imagers and an estimator. The first imager generates first and second standard images respectively captured at first and second times. The second imager generates first and second reference images respectively associated with the first and second times. The estimator estimates, based on the first and second standard images and the first and second reference images, (a) a pose of the first imager at the first time, with a pose of the first imager at the second time being regarded as a standard and (b) a positional shift of the second imager capturing the first reference image from an estimated position of the second imager at the first time.

7 Claims, 6 Drawing Sheets

(51) Int. Cl.
*G06T 7/80* (2017.01)
*G06T 7/593* (2017.01)
*H04N 13/211* (2018.01)

(52) U.S. Cl.
CPC ............... *G06T 7/74* (2017.01); *G06T 7/85* (2017.01); *G05D 2201/0215* (2013.01); *G06T 2207/10021* (2013.01); *G06T 2207/10028* (2013.01); *G06T 2207/30244* (2013.01)

(58) Field of Classification Search
CPC .... G06T 2207/10028; G06T 2207/10021; G05D 1/0251; G05D 2201/0215
See application file for complete search history.

(56) References Cited

U.S. PATENT DOCUMENTS

| | | | | |
|---|---|---|---|---|
| 2006/0222238 | A1* | 10/2006 | Nishiyama | G06K 9/32 382/154 |
| 2010/0060735 | A1 | 3/2010 | Sato | |
| 2012/0121161 | A1* | 5/2012 | Eade | G09B 29/007 382/153 |
| 2015/0052703 | A1 | 2/2015 | Lee et al. | |
| 2016/0295232 | A1* | 10/2016 | Yamamoto | H04N 19/521 |
| 2018/0296049 | A1* | 10/2018 | Izawa | A47L 9/28 |

FOREIGN PATENT DOCUMENTS

| | | |
|---|---|---|
| JP | 2017-27417 | 2/2017 |
| TW | M451102 U | 4/2013 |
| TW | M477595 U | 5/2014 |
| WO | WO 2008102764 A1 | 8/2008 |

OTHER PUBLICATIONS

Lukierski et al., "Rapid Free-Space Mapping From a Single Omni-directional Camera," 2015 European Conference on Mobile Robots (Sep. 2015), pp. 1-8.

Mhiri et al., "Accurate Scale Estimation Based on Unsynchronized Camera Network," 2015 IEEE International Conference on Image Processing (Sep. 2015), pp. 4180-4184.

Zhou et al., "Dynamic Depth Recovery from Unsynchronized Video Streams," IEEE Computer Society Conference on Computer Vision and Pattern Recognition (Jun. 2003), pp. 1-8.

* cited by examiner

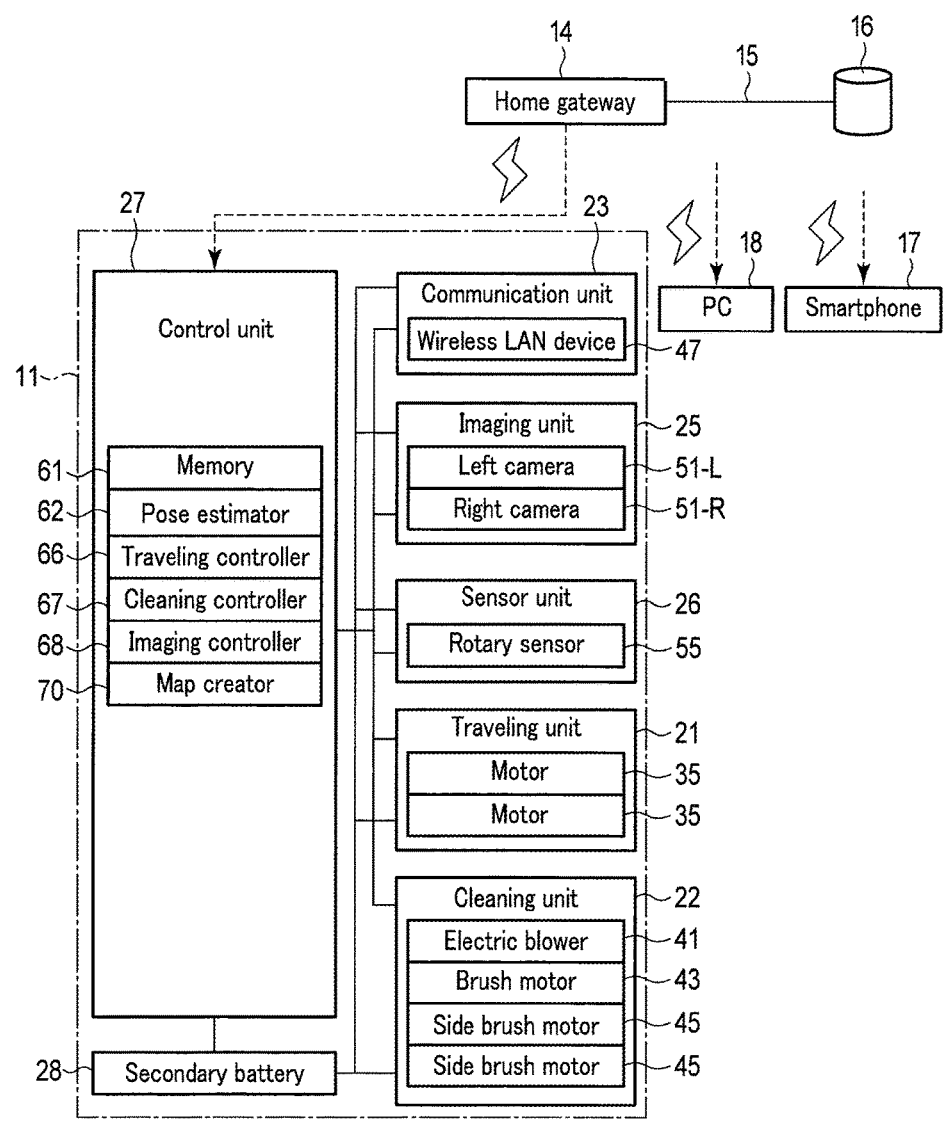
F I G. 7

POSE ESTIMATION APPARATUS AND VACUUM CLEANER SYSTEM

CROSS-REFERENCE TO RELATED APPLICATIONS

This application is based upon and claims the benefit of priority from Japanese Patent Application No. 2015-225013, filed Nov. 17, 2015, the entire contents of which are incorporated herein by reference.

FIELD

Embodiments described herein relate generally to pose estimation.

BACKGROUND

In the fields of computer vision and robotics, use is made of the technique for estimating the camera pose on the basis of the images captured by the camera. The technique is applied, for example, to the localization of an autonomous mobile robot, a navigation system, an AR (augmented reality) technology.

To be more specific, researches have been made of SLAM (Simultaneous Localization and Mapping) and SfM (Structure from Motion) as a technique for simultaneously estimating the camera pose and the three-dimensional structure of ambient objects to be photographed.

A monocular camera or a stereo camera may be used for the pose estimation. In particular, if the SLAM is performed using the stereo camera, the absolute scale of the three-dimensional structure of the surroundings of the stereo camera can be estimated.

In the SLAM using the stereo camera, the three-dimensional point of a feature point is restored based on the stereo image captured at a certain point of time (t), and the pose of the stereo camera at another point of time (t+1) is estimated in such a manner as to minimize the re-projection error of the case where the three-dimensional point is projected in the stereo camera at point of time (t+1).

BRIEF DESCRIPTION OF THE DRAWINGS

FIG. 7 is a block diagram illustrating an example of a vacuum cleaner according to the second embodiment.

DETAILED DESCRIPTION

Figure 1:
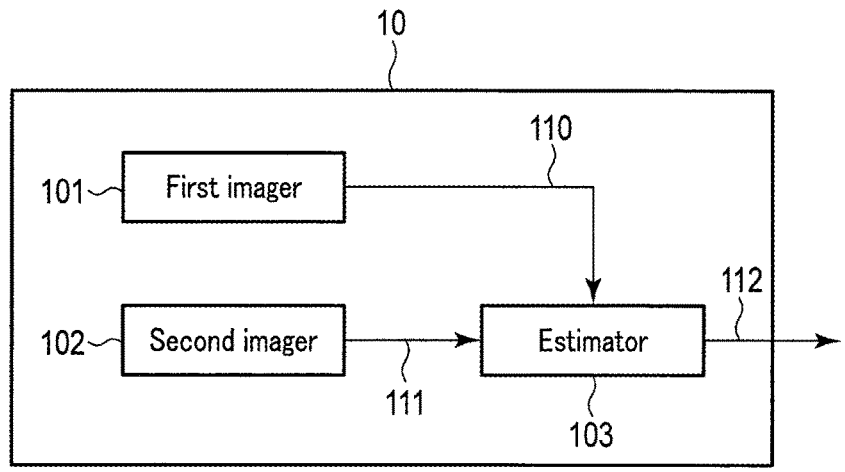
FIG. 1 is a block diagram illustrating an example of a pose estimation apparatus according to the first embodiment.

The accuracy of pose estimation is dependent on the accuracy of restoration of a three-dimensional point and re-projection of the point. If the imaging timings of two cameras are not synchronous, the stereo camera may move after one of the cameras captures an image and before the other camera captures an image. In this case, the other camera may capture the image at a position shifted from the ideal imaging position. Therefore, if the stereo camera whose imaging times are asynchronous is used, accurate restoration of a three-dimensional point and re-projection of the point are hard to perform. In other words, the pose estimation is premised on the synchronization between the imaging timings of the stereo camera.

However, a dedicated stereo camera provided with a synchronizing circuit for synchronizing the imaging timings is costly. Under the circumstances, there is a demand for a technique for estimating a pose with high accuracy, using a stereo camera provided with two general-purpose cameras (which are comparatively inexpensive).

A description will now be given of the embodiments with reference to the accompanying drawings.

According to an embodiment, a pose estimation apparatus includes a first imager, a second imager and an estimator. The first imager generates a first standard image captured at a first time and a second standard image captured at a second time. The second imager generates a first reference image associated with the first time and a second reference image associated with the second time. The estimator estimates, based on the first standard image, the second standard image, the first reference image and the second reference image, (a) a pose of the first imager at the first time, with a pose of the first imager at the second time being regarded as a standard and (b) a positional shift of the second imager capturing the first reference image from an estimated position of the second imager at the first time.

Hereinafter, the elements which are the same as or similar to those previously described are assigned with the same or similar reference numerals or symbols, and redundant descriptions will be omitted in principle.

First Embodiment

As shown in FIG. 1, a pose estimation apparatus 10 of the first embodiment includes a first imager 101, a second imager 102 and an estimator 103. For descriptive purposes, it is assumed that the pose estimation processing (which will be described in detail later) is executed according to the imaging timing of the first imager 101, and the first imager 101 and the second imager 102 will be respectively referred to as a standard camera and a reference camera, where appropriate.

The first imager 101 generates a standard image by imaging. The first imager 101 performs imaging a number of times. The first imager 101 repeatedly performs imaging in a first period. The first imager 101 provides the estimator 103 with a plurality of standard images 110.

The first imager 101 can be realized by a digital camera provided with (i) an optical system including a plurality of lenses, and (ii) an image sensor made of a CMOS (Complementary Metal Oxide Semiconductor), a CCD (Charge Coupled Device) or the like. The first imaging region imaged by the first imager 101 is part of the external world of the first imager 101. The range that can be imaged by the first imager 101 is determined depending upon the angle of view of the first imager 101 and the size of the image sensor. Where the first imager 101 is realized by a general digital camera, the first period is approximately 30 fps (frames per second) or 60 fps.

The second imager 102 generates a reference image 111 by imaging a second imaging area which partly overlaps the first imaging area. The second imager 102 performs imaging a number of times. The second imager 102 repeatedly performs imaging in a second period. The second imager 102 provides the estimator 103 with a plurality of reference images ill. The pose of the second imager 102 can be obtained relative to the pose of the first imager 101 functioning as the standard camera. The pose of the second imager 102 relative to the pose of the first image may be stored in the estimator 103 (described later) or a storage (not shown).

Like the first imager 101, the second imager 102 can be realized by a digital camera. The internal parameters (e.g., the resolution and the focal length of a lens) of the second imager 102 may be the same as, or different from those of the first imager 101. In the description set forth below, the internal parameters of the first imager 101 and the internal parameters of the second imager 102 are assumed to be the same. The second period may be synchronous with the first period, or may be asynchronous therewith. That is, the pose estimation apparatus 10 does not have to employ a synchronizing circuit for synchronizing the imaging by the first imager 101 and the imaging by the second imager 102.

Figure 3:
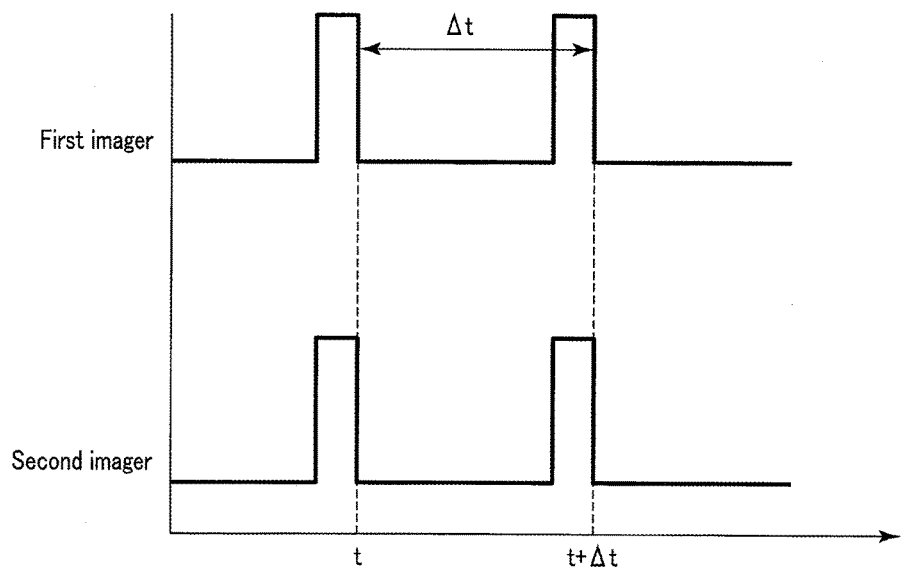
FIG. 3 is a timing chart illustrating an example of imaging timings where the first period in which a first imager captures an image and the second period in which a second imager captures an image are synchronous with each other.

If the second period is synchronous with the first period, the first imager 101 and the second imager 102 operate at the same intervals and start and end imaging at the same timing, as shown in FIG. 3. In this case, the pose of the first imager 101 (standard camera) can be estimated with high accuracy by executing the conventional SLAM using a stereo camera whose imaging timings are synchronous.

Figure 4:
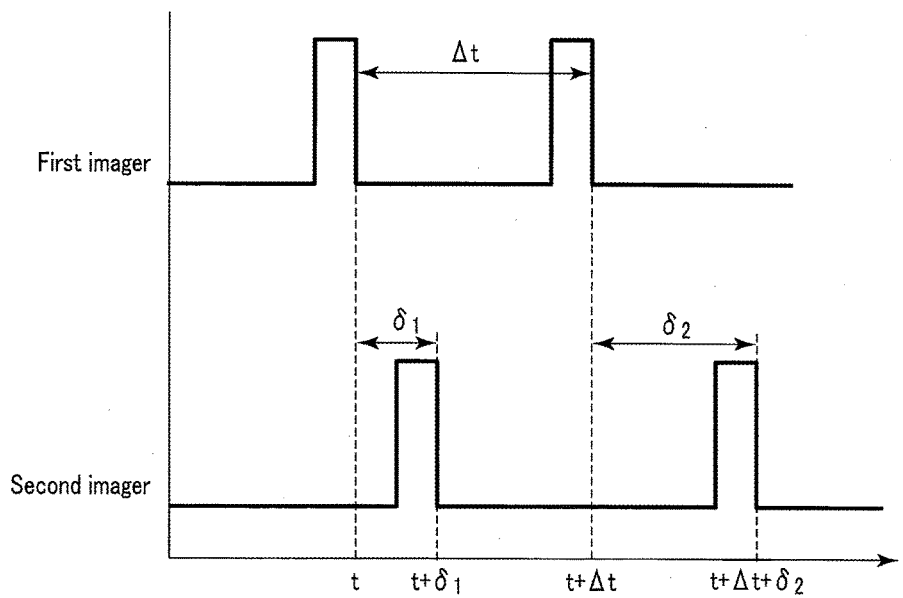
FIG. 4 is a timing chart illustrating an example of imaging timings where the first period of the first imager and the second period of the second imager are asynchronous.

If the second period is not synchronous with the first period, the first imager 101 and the second imager 102 perform imaging at different timings, as shown in FIG. 4. To be specific, where the first imager 101 performs imaging at a certain time (t), the second imager 102 performs imaging at time ($t+\delta_1$), which is a delay time ($\delta_1$) after the imaging performed by the first imager 101. Likewise, where the first imager 101 performs imaging at another time (t+Δt), the second imager 102 performs imaging at time ($t+\Delta t+\delta_2$), which is a delay time ($\delta_2$) after the imaging performed by the first imager 101. The delay times ($\delta_1$) and ($\delta_2$) may be equal to each other or different from each other.

If the second imager 102 moves during the delay time ($\delta_1$ or $\delta_2$), the position where the second imager 102 performs imaging is shifted from the ideal image position (i.e., the position where the second imager 102 should be at time (t) or (t+Δt).) That is, the position where the second imager 102 captures a reference image is shifted from the estimated position where the second imager 102 should be at time (t+Δt). The estimated position of the second imager 102 can be derived from a predetermined pose of the second imager, which is relative to the pose of the first imager 101.

As will be described below, however, the estimator 103 can accurately estimate the poses of the first imager 101 and the second imager 102 even if the above-mentioned positional shift occurs due to the asynchronous imaging timings between the first imager 101 and the second imager 102.

The estimator 103 receives a standard image 110 from the first imager 101 and a reference image 111 from the second imager 102. The estimator 103 performs estimation processing based on the standard image 110-1 and reference image 111-1 associated with the first time (t+1) and on the standard image 110-2 and reference image 111-2 associated with the second time (t), which is before the first time (t+1). The estimator 103 estimates a relative pose of the first imager 101 at the first time (t+1) (with the pose at the second time (t) being regarded as a standard). The estimator 103 also estimates how the second imager 102 is shifted from the ideal imaging positions where the second imager 102 captures reference images 111-1 and 111-2 (i.e., the positions where the second imager 102 is located at the first time (t+1) and the second time (t)). The relative pose of the first imager 101 at the first time (t+1) and the positional shifts of the second imager 102 from the ideal imaging positions where the second imager 102 captures reference images 111-1 and 111-2 may be estimated simultaneously. The estimator 103 externally outputs estimated data, representing the results of estimation.

Figure 2:
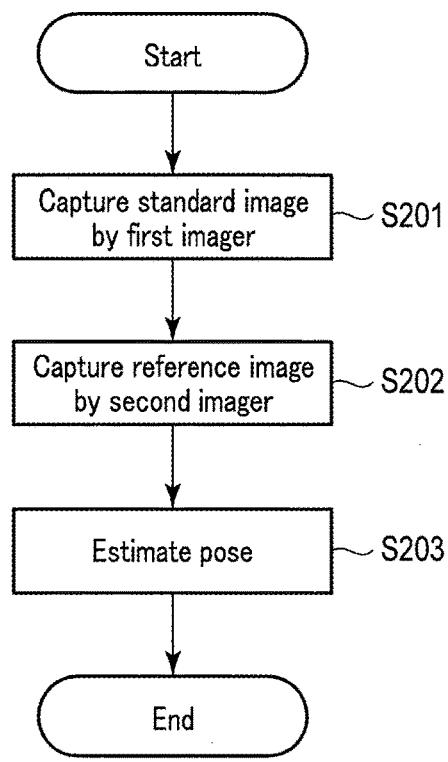
FIG. 2 is a flowchart illustrating an example of an operation performed by the pose estimation apparatus depicted in FIG. 1.

The pose estimation apparatus 10 operates, for example, in such a manner as is shown in FIG. 2. The operation shown in FIG. 2 starts when the first imager 101 (standard camera) captures a standard image 110-1 at the first time (t+1) (step S201). On the other hand, the second imager 102 (reference camera) captures a reference image 111-1 (step S202). Although step S202 is executed after step S201 in the example shown in FIG. 2, the steps may be executed in the reverse order or may be executed simultaneously.

The estimator 103 estimates the pose of the first imager 101 (standard camera), based on the standard image 110-1 and reference image 111-1 respectively captured in steps S201 and S202 and the standard image 110-2 and reference image 111-2 respectively captured in steps S201 and S202 last time (step S203).

To be more specific, the estimator 103 performs rectification for the standard image 110-1 and reference image 111-1. By this rectification, the standard image 110-1 and reference image 111-1 are converted into a pair of stereo images, like those captured by a perfect parallel stereo camera. If lens distortion removal is included in the rectification, two conversions can be performed at a time. Conversion parameters can be calculated based on external parameters and lens distortion parameters of the first imager 101 and second imager 102 which are determined by calibration. By performing the rectification, the search range in which feature points are searched for between images is limited to one horizontal line of the images, and easy and robust search is thus enabled. In addition, the computation for restoring three dimensional points utilizing triangulation can be simplified.

Then, the estimator 103 extracts feature points from four images, including a pair of stereo images captured at the first time (t+1) and a pair of stereo images captured at the second time (t) (the latter images may be generated when step S203 is executed last time), and searches for all correspondences. The extraction of feature points and the search for correspondences are performed, for example, based on feature amounts. The feature amounts can be calculated using such techniques as SIFT (Scale-Invariant Feature Transform), SURF (Speeded Up Robust Features), ORB (Orientated FAST and Rotated BRIEF), KAZE (KAZE Features), AKAZE (Accelerated KAZE), etc.

Subsequently, the estimator 103 simultaneously estimates the relative pose of the first imager 101 at the first time (t+1) and the positional shifts of the second imager 102 from the ideal imaging positions where the second imager 102 captures reference images 111-1 and 111-2.

The ideal imaging position where the reference image 111-1 is captured can be calculated, for example, by shifting the position of the first imager 101 at the first time (t+1) in accordance with the positional relationship between the first imager 101 and the second imager 102. The positional relationship between the first imager 101 and the second imager 102 may be derived, for example, at the time of calibration.

The positional shift of the second imager 102 from the ideal imaging position can be decomposed into a shift caused by translational motion and a shift caused by rotation. Let us assume that the second imager 102 translationally moves in a direction perpendicular to the straight line connecting the optical center of the second imager 102 and a given feature point. In this case, the positional shift of a projected point corresponding to the feature point in the reference image 111-1 decreases in inverse proportion to the distance between the optical center of the second imager 102 at the first time (t+1) and the feature point. If the second imager 102 rotates, the positional shift of the projected point corresponding to a given feature point in the reference image 111-1 does not depend on the distance between the optical center of the second imager 102 at the first time (t+1) and the feature point. Therefore, as long as the second imager 102 is away from the feature point more than a certain distance, the positional shift of the projected point corresponding to the feature point in the reference image 111 is dependent mainly on the rotation. In the description below, therefore, the shift of the second imager 102 from the ideal imaging position will be regarded as a shift caused by the rotation.

The estimator 103 expresses the relative pose of the first imager 101 at the first time (t+1), using a three-dimensional translation vector t and a rotation matrix R of 3 rows×3 columns. The estimator 103 expresses how the second imager 102 is shifted from the ideal positions at the second time (t) and the first time (t+1), using rotation matrices $R_1$ and $R_2$ of 3 rows×3 columns. The estimator 103 estimates the values of these parameters t, R, $R_1$ and $R_2$ in such a manner as to minimize the evaluation function represented by formula (1) set forth below, in which the parameters are used as variables.

$$E(t, R, R_1, R_2) = \sum_i \left( \|w_i^{CL} - \overline{w}_i^{CL}\|^2 + \|w_i^{CR} - \overline{w}_i^{CR}\|^2 \right) \quad (1)$$

In formula (1), $w_i^{CR}$ and $w_i^{CL}$ represent positions of an i-th feature point in right and left images (reference image 111-1 and standard image 110-1 obtained after the aforesaid conversion) at the first time (t+1). Further, $\overline{w}_i^{CR}$ and term $\overline{w}_i^{CL}$ represent the positions of re-projected points, which are obtained by projecting the restored positions (which are restored based on the i-th feature point in the right and left images at the second time (t)) in the first imager 101 and the second imager 102 at the first time (t+1). The feature points and the re-projected point are expressed in homogeneous coordinates. The restored positions are expressed either two-dimensionally or three-dimensionally, based on the standard position at time (t+Δt), for example.

Formula (1) evaluates an error of the positions of re-projected points relative to the positions of the feature points (the error will be hereinafter referred to as a re-projection error), so that formula (1) can be called a re-projection error function.

The positions of the re-projected points can be calculated, using formula (2) set forth below.

$$\overline{w}_i^{CL} = A(Rp_i + t)$$

$$\overline{w}_i^{CR} = AR_2(Rp_i + t + t_B) \quad (2)$$

In formula (2), A is a matrix of 3 rows×3 columns, which represents the internal parameters of the first imager 101 (or second imager 102). As described above, the internal parameters of the first imager 101 are assumed to be the same as those of the second imager 102. In formula (2) $t_B$ is equal to [−b 0 0], where b is a baseline between the first imager 101 and the second imager 102, and can be derived, for example, at the time of calibration. In formula (2), $p_i$ represents a restored three-dimensional point and can be derived, using formula (3) below.

$$p_i = tri(w_i^{PL}, \tilde{w}_i^{PR})$$

$$\tilde{w}_i^{PR} = AR_1 A^{-1} w_i^{PR} \quad (3)$$

In formula (3), tri(z,z') is a function for restoring a three-dimensional point based on the principles of triangulation. Where $z=[z_x\ z_y\ 1]^T$ and $z'=[z_x'\ z_y'\ 1]^T$, tri(z,z') can be represented by formula (4) below.

$$tri(z, z') = \begin{bmatrix} \dfrac{b(z_x - c_x)}{z_x - z_x'} \\ \dfrac{b(z_y - c_y)}{z_x - z_x'} \\ \dfrac{bf}{z_x - z_x'} \end{bmatrix}. \quad (4)$$

In formula (4), $c_x$ is an x coordinate of the optical center of the first imager 101 (or second imager 102), $c_y$ is a y coordinate of that optical center, and f is a focal distance of the first imager 101. As described above, the internal parameters (including $c_x$, $c_y$ and f) of the first imager 101 are assumed to be the same as those of the second imager 102. $c_x, c_y$ and f can be derived at the time of calibration.

Figure 5:
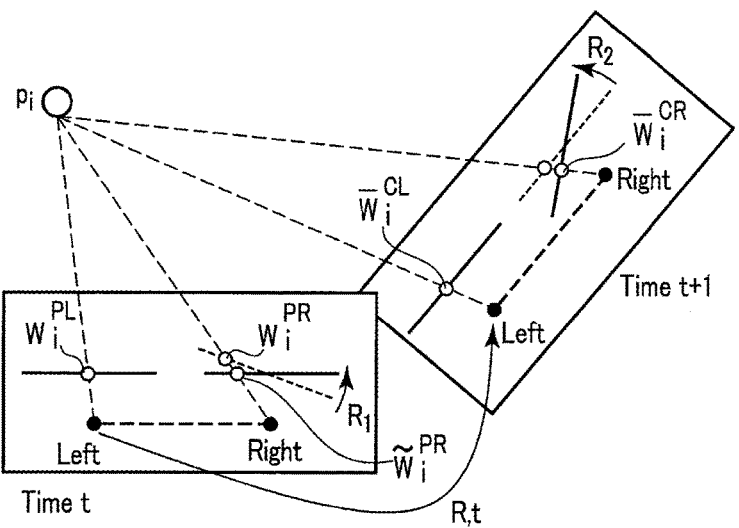
FIG. 5 is an explanatory diagram illustrating the estimation process performed by the pose estimation apparatus depicted in FIG. 1.

Various points described above and the relationship between a vector and a matrix are schematically illustrated in FIG. 5. To minimize the re-projection error, the estimator 103 can use the Newton method, quasi-Newton method, Levenberg-Marquardt method, or the like. When correspondences between feature points are searched for, an erroneous correspondence may be included. Therefore, the estimator 103 may use, for example, RANSAC (Random sample consensus) so that the estimation processing can be robust.

In the example described above, the estimator 103 expresses the relative pose of the first imager 101, using three-dimensional translation vector t and rotation matrix R, and expresses a shift of the second imager 102 from the ideal imaging position, using rotation matrices $R_1$ and $R_2$. However, the estimator 103 can express the relative pose of the first imager 101 and the shifts of the second imager 102 from the ideal imaging positions as different parameters.

To be specific, if it can be assumed that the first imager 101 and the second imager 102 move on a two-dimensional plane with three degrees of freedom (an x-translation component, a y-translation component and a rotation component), then the relative pose of the first imager 101 can be expressed, using an x-translation component $t_x$, a y-translation component $t_y$ and a rotation component (angle) θ. Likewise, the relative pose of the first imager 101 and the shifts of the second imager 102 from the ideal imaging positions can be expressed, using rotation components $\theta_1$ and $\theta_2$. Therefore, the re-projection error function represented by above formula (1) can be replaced with formula (5) set forth below.

$$E(t_x, t_y, \theta, \theta_1, \theta_2) = \sum_i \left( \|w_i^{CL} - \overline{w}_i^{CL}\|^2 + \|w_i^{CR} - \overline{w}_i^{CR}\|^2 \right) \quad (5)$$

In the above example, the estimator 103 simultaneously estimates the parameter set of the translation vector t and the rotation matrices R, $R_1$ and $R_2$, or the parameter set of the x-translation component $t_x$, y-translation component $t_y$ and the rotation components $\theta$, $\theta_1$ and $\theta_2$. However, the estimator 103 may have estimated how the second imager 102 is shifted from the ideal imaging position at the second time (t) (namely, rotation matrix $R_1$ or rotation component $\theta_1$). In such a case, the estimator 103 may use the past estimated values for the rotation matrix $R_1$ or rotation component $\theta_1$ so that the re-projection error function shown in formula (1) or formula (5) can be minimized. However, the errors attributable to the re-use of the rotation matrix $R_1$ or rotation component $\theta_1$ are accumulated in accordance with an increase in the number of times the estimation processing is repeated. In order to enable highly-accurate estimation, therefore, it is preferable that all parameters be estimated simultaneously.

Figure 6:
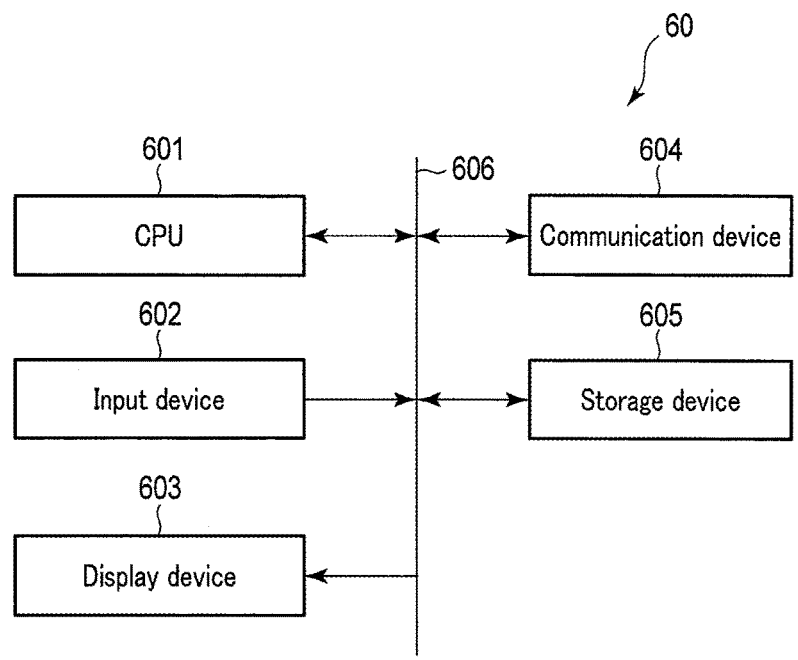
FIG. 6 is a block diagram illustrating an example of the hardware structure of the pose estimation apparatus depicted in FIG. 1.

The pose estimation apparatus of the first embodiment may be implemented by employing a computer 60 shown in FIG. 6, for example. The computer 60 comprises a CPU (Central Processing Unit) 601, an input device 602, a display device 603, a communication device 604 and a storage device 605. These elements are connected together by a bus 606.

The CPU 601 is an electronic circuit which functions as a control device of the computer 60 or a computing device by executing various programs. The CPU 601 receives data, for example, from the input device 602, the communication device 604 or the storage device 605, and performs an operation. The CPU supplies operation results or control signals based on the operation results to the display device 603, communication device 604 and storage device 605.

To be more specific, the CPU 601 executes, in addition to the OS (operating system) of the computer 60, a pose estimation program (which is a program for causing the computer 60 to function as a pose estimation apparatus of the first embodiment and which can be called an image processing program as well). By executing the program, the CPU 601 controls the devices connected through the bus 606.

The pose estimation program is stored in a non-transitory, tangible, computer-readable storage medium. The storage medium may be an optical disk, a magneto optical disk, a magnetic disk, a magnetic tape, a flash memory, or a semiconductor memory, but is not limited to these. The pose estimation program may be stored in the storage device 605 beforehand, may be stored in a storage medium other than the storage device 605, or may be uploaded in a network (such as the Internet). In any case, the pose estimation program is installed in the computer 60, and the CPU 601 executes the pose estimation program. As a result, the computer 60 functions as the pose estimation apparatus of the first embodiment.

The input device 602 receives input information to be supplied to the computer 60. The input device 602 can include digital cameras functioning as the first imager 101 and the second imager 102. The input device 602 can also include, for example, a keyboard, a mouse and a touch panel.

The display device 603 displays a still image or a video. The display device 603 is, for example, an LCD (Liquid Crystal Display), a CRT (Cathode Ray Tube) or a PDP (Plasma Display Panel), but is not limited to these. The display device 603 may display, for example, a standard image 110 and a reference image 111, or may display feature points included in the standard image 110 and reference image 111. Alternatively, the display device 603 may display a map image prepared based on the execution results of the pose estimation program. Furthermore, the display device 603 may display a map image on which the current pose of the first imager 101 (standard camera) is superimposed, or a map image on which the change tracking of the pose of the first imager 101 (standard camera) is superimposed.

The communication device 604 performs wire communication or wireless communication with an external apparatus. The communication device 604 is, for example, a modem, a hub or a router, but is not limited to these. The first imager 101 and the second imager 102 may be provided for an external apparatus, instead of providing them for the computer 60. In this case, the CPU 601 performs the pose estimation processing based on the standard image 110 and reference image 111 received by the communication device 604.

The storage device 605 stores various programs (e.g., the OS of the computer 60 and the pose estimation program), data necessary for the execution of the programs, data generated by the execution of the programs, etc.

The storage device 605 includes a main memory and an external storage device. The main memory is a RAM, such as a DRAM (Dynamic Random Access Memory) or an SRAM (Static Random Access Memory), but is not limited to these. The external storage device is, for example, a hard disk, an optical disk, a flash memory or a magnetic tape, but is not limited to these.

Each of the CPU 601, input device 602, display device 603, communication device 604 and storage device 605 may incorporate a plurality of devices. Peripheral devices not shown in FIG. 6 (e.g., a printer and a scanner) may be connected to the computer 60.

The pose estimation apparatus of the first embodiment may be implemented not by a single computer 60 but by a number of mutually-connected computers 60 (i.e., a computer system).

As described above, the pose estimation apparatus of the first embodiment simultaneously estimates the relative pose of the first imager at the first time (t+1), with the second time used as a standard, and the positional shifts of the second imager from the ideal imaging positions where the second imager 102 captures first and second reference images. Therefore, the pose estimation apparatus can estimate the pose of the first imager (standard camera) even if the imaging timing of the first imager and the imaging timing of the second imager are not synchronous with each other. That is, the pose estimation apparatus can be implemented by a stereo camera employing two general-purpose cameras, which are inexpensive.

Even if the time difference between the first time or second time and the time when the second imager captures the first reference image or second reference image is unknown, the pose estimation apparatus can estimate how the second imager is shifted from the ideal imaging position associated with the first or second time. Therefore, the pose estimation apparatus can be used even if a time stamp for measuring the time difference is unavailable.

In addition, the pose estimation apparatus does not simplify how the second imager moves from the first or second time to the time when the first reference image or second reference image is captured. For example, the pose estimation apparatus does not assume that the motion of the second imager is a uniform linear motion. Even if the motion of the second imager includes a rotation motion or an accelerated motion, the pose estimation apparatus can accurately estimate how the second imager is shifted from the ideal imaging position at the first time or second time.

When the pose estimation apparatus of the present embodiment is applied, a mobile object can acquire data on a current position or a target position and can efficiently move from the current position to the target position. The mobile object may be provided with the pose estimation apparatus; alternatively, the mobile object may receive movement instructions remotely transmitted from the pose estimation apparatus.

Second Embodiment

Figure 8:
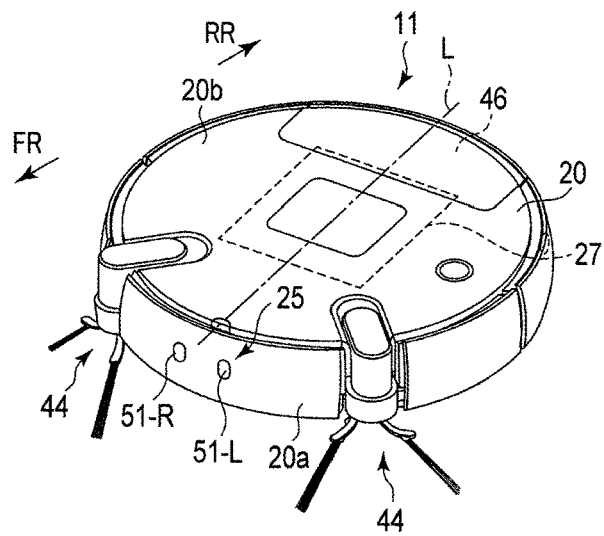
FIG. 8 is a perspective view of the example of the vacuum cleaner of the second embodiment.
Figure 9:
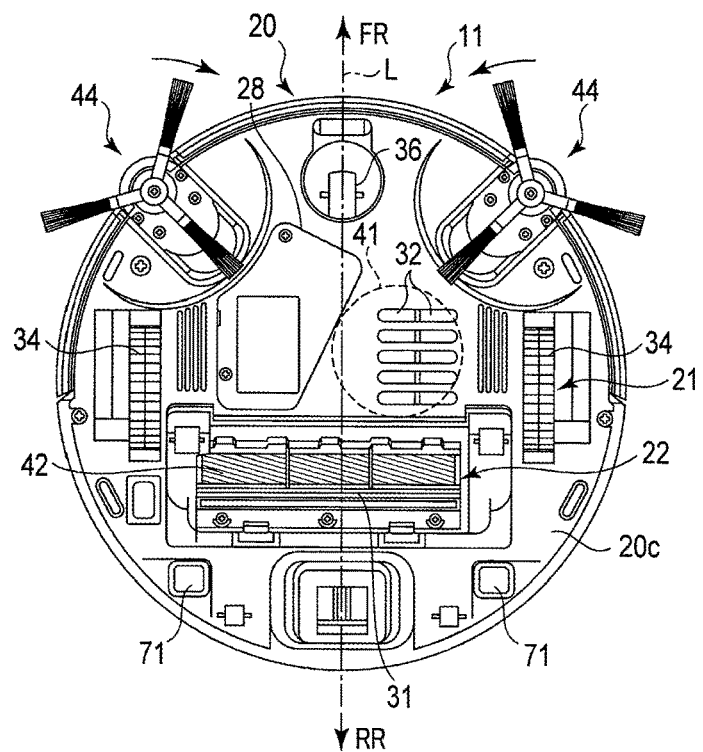
FIG. 9 is a bottom view of the example of the vacuum cleaner of the second embodiment.

The pose estimation apparatus of the first embodiment can be incorporated in a vacuum cleaner (vacuum cleaner system) 11, such as that shown in FIGS. 7 to 9. The vacuum cleaner 11 is a so-called self-propelled robot cleaner (referred to as a cleaning robot as well) and sweeps a sweep-target area (e.g., the floor of a building) while moving autonomously.

Figure 10:
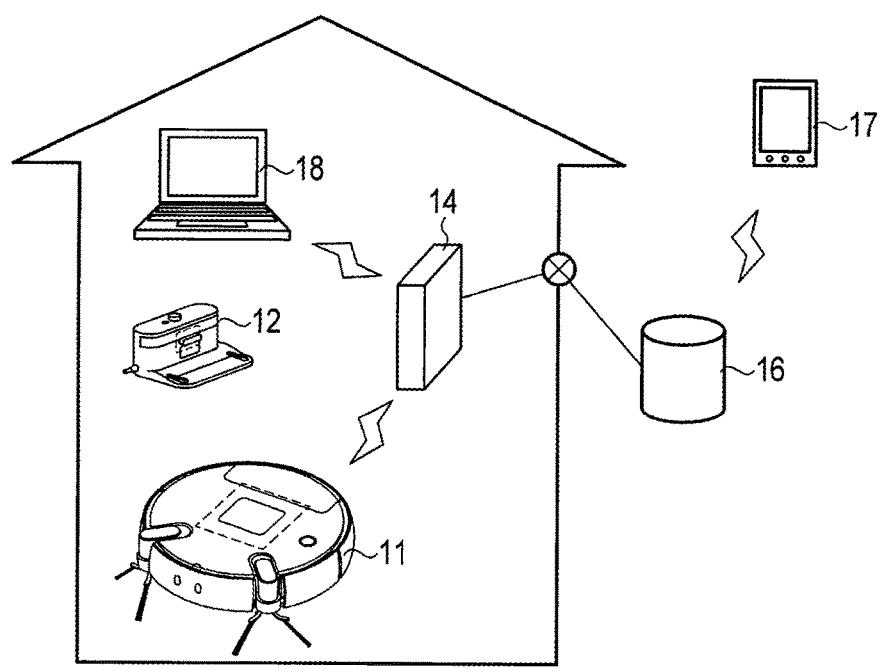
FIG. 10 is a diagram illustrating an example of a network including the vacuum cleaner of the second embodiment.

The vacuum cleaner 11 can perform a series of sweep operations, with the charger 12 shown in FIG. 10 as a base. That is, the vacuum cleaner 11 leaves the charger 12, sweeps the floor while moving, and returns to the charger 12, where the vacuum cleaner 11 waits for a next sweep operation instruction. In the state where the charger 12 is connected to the vacuum cleaner 11 both mechanically and electrically, the charger 12 charges a secondary battery 28 incorporated in the vacuum cleaner 11.

As shown in FIGS. 7 and 10, the vacuum cleaner 11 may perform wire communication or wireless communication (e.g., Wi-Fi [registered trade name] or Bluetooth [registered trade name]) with a home gateway 14 serving as a relay. The home gateway 14 may be replaced with a router, an access point, or the like. The home gateway 14 is connected to a network 15, such as the Internet, for example, by wireline connection, and can communicate through the network 15 with external communication devices, including a server 16, a smartphone 17 and a PC 18 (which may be a tablet type). That is, the vacuum cleaner 11 can communicate, through the home gateway 14 and network 15, with the server 16, the smartphone 17, the PC 18, or the like.

The server 16 is a computer connected to the network 15 (a cloud server) and can store various kinds of data on the vacuum cleaner 11 (for example, images transmitted from the vacuum cleaner 11). The server 16 may transmit the data stored therein in response to a request made by the smartphone 17 or the PC 18.

Inside the building in which the home gateway 14 is installed, the smartphone 17 or PC 18 can perform wire communication or wireless communication with the vacuum cleaner 11 by way of the home gateway 14. When located outside the building, the smartphone 17 or PC 18 can perform wire communication or wireless communication with the vacuum cleaner 11 by way of the network 15. Each of the smartphone 17 and the PC 18 includes a display device for displaying images.

Thanks to the network described above, the user of the vacuum cleaner 11 can send operation instructions to the vacuum cleaner 11 by operating the smartphone 17 or the PC 18, and can check results of the sweep operation of the vacuum cleaner 11 (e.g., data on how the vacuum cleaner 11 moved) by looking at the images shown on the display device of the smartphone 17 or the PC 18. The images are downloaded, for example, from the server 16.

The vacuum cleaner 11 includes a body case 20. The body case 20 is a substantially cylindrical case (a thick disk) made of synthetic resin or the like. To be more specific, the body case 20 includes a substantially circular top surface portion 20b, a bottom surface portion 20c, and a side surface portion 20a connecting these portions. The body case 20 is hollow and contains various components, including a control unit 27, a secondary battery 28, an electric blower 41 and a dust collection portion 46.

In the description below, the direction substantially parallel to the rotating shaft of drive wheels 34 by which the vacuum cleaner 11 is moved will be referred to as the right-and-left direction (widthwise direction), and the traveling direction of the vacuum cleaner 11, which is substantially perpendicular to the widthwise direction, will be referred to as a forward-and-backward direction (indicated by FR and RR in FIGS. 8 and 9). To facilitate understanding, a centerline L parallel to the forward-and-backward direction is drawn in FIGS. 8 and 9.

As shown in FIG. 8, an imaging unit 25 (including a right camera 51-R and a left camera 51-L) is attached to the front portion of the side surface portion 20a of the body case 20. The right camera 51-R and the left camera 51-L are provided such that the straight line connecting them is substantially parallel to the widthwise direction (i.e., the direction of the rotating shaft of the drive wheels 34). The right camera 51-R and the left camera 51-L capture an image of, for example, a visible light range. Since an image of a visible light range has better quality than an image of an infrared range, it can be visually presented to the user without being subjected to complicated image processing.

A lamp (not shown) such as a light emitting diode (LED) may be attached around the right camera 51-R and left camera 51-L. The lamp is controlled by the control unit 27 (to be described in detail later) such that it is lit when the ambient brightness is less than a predetermined value and is not lit otherwise. When the lamp is lit, it emits light including a visible light range and thus serves as an illuminator for the right camera 51-R and left camera 51-L. Because of the lamp, an appropriate image can be captured even in shadows (dark places) and at night.

The right camera 51-R and the left camera 51-L may be infrared cameras which capture an image of an infrared range. In this case, light including an infrared range is emitted from a lamp (not shown), and a proper image can be stably captured without reference to the ambient brightness. If the light emitted by the lamp does not include a visible light range, a person around the lamp does not perceive the light as being bright even when the lamp is lit in shadows (dark places) or at night, and an image capturing operation can be continued.

The bottom surface portion 20c faces a sweep-target area when the vacuum cleaner 11 moves. As shown in FIG. 9, drive wheels 34 and a slewing wheel 36, which permit the vacuum cleaner 11 to move, are exposed. A suction port 31 (serving as a dust collecting port) and exhaust ports 32 are open in the bottom surface portion 20c. A rotary brush 42 (serving as a rotary cleaning member which scoops dust into the suction port 31) is rotatably provided in the neighborhood of the suction port 31. Side brushes 44 (serving as auxiliary cleaning members which scoop dust) are rotatably attached on the respective sides of the front portion of the bottom surface portion 20c. Charging terminals 71 are provided on the respective sides of the rear portion of the bottom surface portion 20c. The charging terminals 71 permit the secondary battery 28 contained in the body case 20 to come in electrical and mechanical contact with the charger 12, and the secondary battery 28 can be charged.

As shown in FIG. 7, the vacuum cleaner 11 includes a traveling unit 21, a cleaning unit 22, a communication unit 23, an imaging unit 25, a sensor unit 26, a control unit 27 and a secondary battery 28.

The secondary battery 28 is a power source of the vacuum cleaner 11, and supplies power to the traveling unit 21, cleaning unit 22, communication unit 23, imaging unit 25, sensor unit 26 and control unit 27. The secondary battery 28 is electrically connected to the charging terminals 71 described above, and can be charged when the charger 12 is in electrical and mechanical contact with the secondary battery 28 by way of the charging terminals 71.

The traveling unit 21 enables the body case 20 of the vacuum cleaner 11 to travel above a sweep-target area. To be specific, the traveling unit 21 includes a pair of drive wheels 34, a pair of motors 35 and a slewing wheel 36.

The driving wheels 34 are rotated by the power transmitted from the corresponding motors 35 and move the vacuum cleaner 11 back and forth above the sweep-target area. The rotating shaft of the drive wheels 34 is substantially parallel to the widthwise direction of the body case 20, and are arranged substantially symmetric with reference to the forward-and-backward direction of the body case 20. Each of the drive wheels 34 is individually driven by the corresponding motor 35.

Each of the motors 35 supplies power to the corresponding drive wheel 34 under the control of a traveling controller 66, which is to be described later. The slewing wheel 36 is a driven wheel capable of slewing on the sweep-target area, and is arranged in the center of the front portion of the body case 20, as shown in FIG. 9.

The cleaning unit 22 sweeps the dust on the sweep-target area. To be specific, the cleaning unit 22 includes an electric blower 41, a rotary brush 42, a brush motor 43, a pair of side brushes 44, a pair of side brush motors 45 and a dust collection portion 46. Even if part of the elements described herein are omitted, it is still possible to clean a sweep-target area.

The electric blower 41 is contained in the body case 20 and operates under the control of a cleaning controller 67, which is to be described later. The electric blower 41 sucks dust, together with the air, from the suction port 31, and exhausts the sucked air from the exhaust ports 32. The dust sucked by the electric blower 41 is guided to the dust collection portion 46.

The brush motor 43 rotates the rotary brush 42 under the control of the cleaning controller 67. The side brush motors 45 rotate the side brushes 44 under the control of the cleaning controller 67. The dust collection portion 46 is connected to the suction port 31 and collects the dust sucked from the suction port 31.

The communication unit 23 communicates with external apparatuses, such as the charger 12 and home gateway 14. To be more specific, the communication unit 23 includes a wireless LAN device 47. The communication unit 23 corresponds to the communication device 604 shown in FIG. 6.

By way of the home gateway 14 and network 15, the wireless LAN device 47 transmits various information to external apparatuses (such as the server 16, smartphone 17 and PC 18) and receives various information from the external apparatuses. The wireless LAN device 47 can be contained in the body case 20.

The communication unit 23 can include a transmitter and a receiver (neither is shown). The transmitter may be, for example, an infrared light emitting element which transmits an infrared signal (radio signal) to the charger 12. The receiver may be, for example, a photo transistor which receives an infrared signal (radio signal) transmitted from the charger 12 or from a remote controller (not shown).

The imaging unit 25 captures an image of the region around the vacuum cleaner 11. As mentioned above, the imaging unit 25 includes a right camera 51-R and a left camera 51-L, and can include a lamp (not shown). The right camera 51-R and the left camera 51-L correspond to the second imager 102 and the first imager 101, respectively. The right camera 51-R and the left camera 51-L capture images at the respective individual timings under the control of an imaging controller 68, which is to be described later. The images captured by the right camera 51-R and the left camera 51-L may be compressed in a predetermined data format by an image processing circuit (not shown).

The sensor unit 26 includes, for example, a rotary sensor 55 which measures the number of rotations of each drive wheel 34 or each motor 35. The rotary sensor 55 may be an optical encoder, for example. The rotary sensor 55 can be omitted, if desired.

The control unit 27 controls the traveling unit 21, cleaning unit 22, communication unit 23, imaging unit 25, etc. To be specific, the control unit 27 includes a memory 61, a pose estimator 62, a traveling controller 66, a clearing controller 67, an imaging controller 68 and a map creator 70. The control unit 27 may be a microcontroller, for example. The control unit 27 corresponds to the CPU 601 and storage device 605 shown in FIG. 6.

The function division shown in FIG. 7 is merely an example. For example, part or all of the pose estimator 62, traveling controller 66, cleaning controller 67, imaging controller 68 and map creator 70 may be provided independently of the control unit 27, and two or more of these can be combined in a desired way.

The memory 61 stores various data used for controlling and for performing an operation, such as the images captured by the right camera 51-R and left camera 51-L. Preferably, the data in the memory 61 should be retained without reference to the power state of the vacuum cleaner 11. Therefore, the memory 61 is made of a nonvolatile memory medium such as a flash memory.

The pose estimator 62 corresponds to the estimator 103 shown in FIG. 1. In other words, the pose estimator 62 reads images captured by the right camera 51-R and the left camera 51-L (the images corresponding to the reference image 111 and standard image 110) from the memory 61, and performs the estimation processing described above. The pose estimator 62 generates estimated data, representing the pose of the left camera 51-L, a standard camera. The pose estimator 62 may convert the estimated pose of the left camera 51-L into a pose of the center of the body case 20. This estimated data is used, for example, by the traveling controller 66 to control the autonomous movement (e.g., the determination of the moving speed and direction), or by the map creator 70 to prepare a map.

The traveling controller 66 causes the motors 35 to rotate in the normal direction or in the reverse direction by controlling the magnitudes and directions of the currents flowing through the motors 35. Each drive wheel 34 interlocks with the rotation of the corresponding motor 35, and the vacuum cleaner 11 is moved in a desired direction.

The cleaning controller 67 performs conduction angle control individually for the electric blower 41, the brush motor 43 and the side brush motors 45. The cleaning controller 67 may be provided for each of the electric blower 41, brush motor 43 and side brush motors 45. The imaging controller 68 individually controls the start and end of the image capturing by the right camera 51-R and left camera 51-L.

The map creator 70 generates a map image based on the estimated data generated by the pose estimator 62. In place of a map image of just the external world of the vacuum cleaner 11, the map creator 70 may prepare a map image on which the current pose of the vacuum cleaner 11 is superimposed or a map image on which the change tracking of the pose of the vacuum cleaner 11 is superimposed.

Broadly speaking, the control unit 27 has the following three modes: a sweep mode in which the vacuum cleaner 11 sweeps while moving autonomously; a charging mode in which the secondary battery 28 is charged, with the vacuum cleaner 11 in electrical and mechanical contact with the charger 12; and a standby mode in which the vacuum cleaner 11 waits for a next sweep-mode instruction in a state where it is connected, for example, to the charger 12. In the charging mode, a known technique is available in which a charging circuit (such as a constant current circuit) incorporated in the charger 12 is used. The control unit 27 may cause at least one of the right camera 51-R and the left camera 51-L to capture an image of a predetermined object in accordance with an instruction supplied from the smartphone 17, the PC 18 or a remote controller (not shown).

When a predetermined sweep start time comes or when a sweep start instruction transmitted from the smartphone 17, the PC 18 or the remote controller (not shown) is received, the operating condition of the control unit 27 changes from the standby mode or charging mode to the sweep mode. When the sweep mode is started, the traveling controller 66 of the control unit 27 drives each motor 35, and the vacuum cleaner 11 moves away from the charger 12 by a predetermined distance.

Then, the vacuum cleaner 11 starts sweeping the sweep-target area while moving autonomously. While the vacuum cleaner 11 is moving, the imaging controller 68 of the control unit 27 causes the right camera 51-R and the left camera 51-L to periodically capture images, thereby acquiring a stereo image (i.e., a standard image 110 and a reference image 111) of the region which is ahead of the front portion of the body case 20. The acquired stereo image is stored in the memory 61.

The pose estimator 62 of the control unit 27 reads a stereo image from the memory 61 and performs the estimation processing described above. The pose estimator 62 generates estimated data 112 which represents the pose of the left camera 51-L, the standard camera, (or which represents the pose of the center of the body case 20). Based on the estimated data 112, the traveling controller 66 of the control unit 27 controls the autonomous movement of the vacuum cleaner 11.

Images stored in the memory 61 may be transmitted (uploaded) to the server 16 at predetermined timings by way of the home gateway 14 and network 15. To be specific, the images may be uploaded when the vacuum cleaner 11 returns to the charger 12, may be uploaded at regular or irregular intervals during the sweeping, or may be uploaded in response to a request made by an external apparatus, such as the smartphone or the PC 18. After the transmission, the images may be erased from the memory 61, or the storage area in which the images are stored may be used for writing new data. In this manner, the storage capacity of the memory 61 can be used efficiently. Data may be accumulated in the memory 61, smartphone 17 or PC 18, in place of the server 16.

The cleaning controller 67 of the control unit 27 drives the electric blower 41, brush motor 43 and side brush motors 45, when the vacuum cleaner 11 is moving. As a result, the dust on the sweep-target area is sucked from the suction port 31 and collected in the dust collection portion 46.

After the sweep operation for the sweep-target area ends, the traveling controller 66 of the control unit 27 returns the vacuum cleaner 11 to the charger 12. If the second battery 28 does not store energy sufficient to complete a scheduled sweep operation, the vacuum cleaner 11 may use up the energy of the secondary battery 28. In such a case, the vacuum cleaner 11 may not be able to return to the charger 12. If the energy level of the secondary battery 28 is below a predetermined value (e.g., the voltage of the secondary battery 28 lowers nearly to a discharge cutoff voltage), the traveling controller 66 of the control unit 27 may return the vacuum cleaner 11 to the charger 12 even in the middle of the sweep operation. When the charging terminals 71 are connected to the charger 12 electrically and mechanically, the control unit 27 switches from the sweep mode to the charging mode. After the end of the charging mode, the control unit 27 may switch to the standby mode or to the sweep mode again.

As described above, the vacuum cleaner of the second embodiment estimates its pose, as mentioned in connection with the first embodiment, and moves autonomously based on the estimation results. Since the vacuum cleaner travels in consideration of its own pose and of the maps of the region around the vacuum cleaner, the sweep operation can be accomplished with high efficiency. In addition, the vacuum cleaner can estimate its own pose based on the images captured by a stereo camera asynchronous in imaging timings, the manufacturing cost can be reduced, accordingly.

An image displayed by an external apparatus such as the smartphone 17 and the PC 18 may be processed by the control unit 27 so that it can be properly displayed by the external apparatus. Alternatively, the image may be processed by a dedicated program (application) installed in the external apparatus so that the image can be properly displayed by the external apparatus. Alternatively, the control unit 27 or the server 16 may perform pre-processing of the image so that the external apparatus can display the image by using a general-purpose program, such as a browser. That is, the image display control can be realized by a program installed in any of the control unit 27, the server 16 or an external apparatus.

Images captured by the right camera 51-R and left camera 51-L may be directly displayed by a display provided on the vacuum cleaner 11 (the display corresponding to the display device 603 shown in FIG. 6). In this case, the user can view the images even if the vacuum cleaner 11 cannot transmit the images by way of the home gateway 14 or the network 15. In other words, the images can be viewed even in the environment in which the available network resources are not of good quality, and the structure and control of the vacuum cleaner 11 can be simple.

A sensor, such as a contact sensor for sensing an obstacle located outside the fields of view of the right camera 51-R and left camera 51-L, may be provided on the rear portion of the body case 20. In addition, a step sensor (e.g., an infrared sensor) for sensing a step in the sweep-target area may be provided on the bottom surface portion 20c of the body case 20.

The pose estimator 62 of the vacuum cleaner (vacuum cleaner system) 11 may be provided in the outside of the body case 20 where the imaging unit 25 is contained. In other words, the control unit 27 may be provided independently of the imaging unit 25 and the cleaning unit 22 and may communicate with them by wire or by wireless.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A pose estimation apparatus comprising:
   a first camera configured to generate a first standard image captured at a first time and a second standard image captured at a second time;
   a second camera configured to generate a first reference image associated with the first time and a second reference image associated with the second time; and
   a processor configured to estimate, based on the first standard image, the second standard image, the first reference image and the second reference image, (a) a pose of the first camera at the first time, with a pose of the first camera at the second time being regarded as a standard and (b) a positional shift of a position of the second camera when capturing the first reference image from an estimated ideal position of the second camera at the first time, wherein the estimated ideal position of the second camera at the first time is calculated by shifting the position of the first camera at the first time in accordance with a positional relationship between the first camera and the second camera,
   wherein the processor is further configured to:
      search for corresponding feature points in the first standard image, the second standard image, the first reference image and the second reference image,
      restore positions of the feature points based on the second standard image and the second reference image, and
      estimate (a) and (b), such that an error between re-projected points obtained by projecting restored positions of the feature points on the first camera and the second camera at the first time and the feature points included in the first standard image and the first reference image is minimized.

2. The apparatus according to claim 1, wherein the processor is configured to regard the positional shift of the second camera capturing the first reference image from the estimated position of the second camera at the first time as being caused by a rotation motion.

3. The apparatus according to claim 1, wherein the processor is further configured to estimate a positional shift of a position of the second camera when capturing the second reference image from an estimated ideal position of the second camera at the second time, wherein the estimated ideal position of the second camera at the second time is calculated by shifting the position of the first camera at the second time in accordance with the positional relationship between the first camera and the second camera.

4. The apparatus according to claim 1, wherein the processor is further configured to estimate (c) the pose of the first camera at the first time, with the pose of the first camera at the second time being regarded as the standard, as translation components of two degrees of freedom and a rotation component of one degree of freedom and (d) the positional shift of the second camera capturing the first reference image from the estimated position of the second camera at the first time as a rotation component of one degree of freedom.

5. A vacuum cleaner system comprising the apparatus according to claim 1.

6. The system according to claim 5, further comprising a drive wheel that permits a vacuum cleaner to travel, and wherein
   a rotating shaft of the drive wheel is substantially parallel to a straight line connecting the first camera and the second camera.

7. A non-transitory computer readable storage medium storing instructions of a computer program which when executed by a computer results in performance of stops comprising cause the computer to carry out pose estimation of a first camera of a stereo camera having a first and second camera whose imaging timings are not synchronous with each other, causing the computer to carry out the steps of:
   controlling the first camera that generates a first standard image captured at a first time and a second standard image captured at a second time;
   controlling the second camera that generates a first reference image associated with the first time and a second reference image associated with the second time; and
   estimating, based on the first standard image, the second standard image, the first reference image and the second reference image, (a) a pose of the first camera at the first time, with a pose of the first camera at the second time being regarded as a standard and (b) a positional shift of a position of the second camera when capturing the first reference image from an estimated ideal position of the second camera at the first time, wherein the estimated ideal position of the second camera at the first time is calculated by shifting the position of the first camera at the first time in accordance with a positional relationship between the first camera and the second camera, the estimation step comprising:
      searching for corresponding feature points in the first standard image, the second standard image, the first reference image and the second reference image,
      restoring positions of the feature points based on the second standard image and the second reference image, and
      estimating (a) and (b), such that an error between re-projected points obtained by projecting restored positions of the feature points on the first camera and the second camera at the first time and the feature points included in the first standard image and the first reference image is minimized.

* * * * *